June 11, 1957     P. B. LAVANCHY     2,795,515
PRESSURE SENSITIVE ADHESIVE TAPE AND METHOD OF MAKING SAME
Filed Aug. 11, 1953
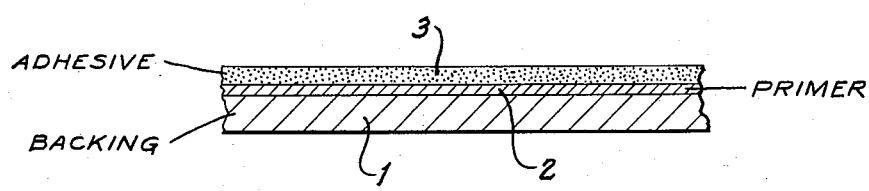
INVENTOR.
PATRICIA BJERREGAARD LAVANCHY
BY
ATTORNEYS.

United States Patent Office 2,795,515
Patented June 11, 1957

2,795,515

PRESSURE SENSITIVE ADHESIVE TAPE AND
METHOD OF MAKING SAME

Patricia Bjerregaard Lavanchy, Trenton, N. J., assignor to Permacel Tape Corporation, a corporation of New Jersey Application August 11, 1953, Serial No. 373,687

11 Claims. (Cl. 117—72)

This invention relates to pressure-sensitive adhesive sheets and tapes. It is concerned particularly with the secure joining of pressure-sensitive adhesives to their backings, and particularly to hydrophilic backings, preferably of the film type.

The single drawing illustrates the product of this invention.

Pressure-sensitive adhesive tapes require secure bonds of the tacky pressure-sensitive adhesive to the backings so as to prevent transfer of adhesive when the tacky surface is pressed into contact with itself, or with a part of the backing, and then pulled apart. Such bonding is accomplished usually by interposing a primer coat between the pressure-sensitive adhesive layer and the flexible backing. The primer films of the prior art are usually two phase primers consisting, for instance, of a mixture of latex rubber and of hydrophilic material having affinity for the hydrophilic film backing. Such primers fail to firmly bond the adhesive tape when it is subjected to moisture and exhibit particularly poor anchorage in humid climates. Even those primers of the prior art that are most resistant to moisture need from one to three days setting time after application to backing before the adhesive is coated, so as to provide secure anchorage. Another disadvantage is their opacity, which affects the finished roll of tape, to make it appear muddy-colored and unsightly. Accordingly, it is an object of this invention to provide new and improved pressure-sensitive adhesive products, particularly sheets and tapes. It is a further object of the invention to provide adhesive sheets having improved anchorage of the adhesive mass on the backings. Still another object is to provide such anchorage permanently and under adverse conditions of high humidity with resultant condensation of moisture on the tape. A particularly important object of the invention is the provision of improved primers for use on normally tacky and pressure-sensitive adhesive products having backings such as cellulosic backings, especially regenerated cellulose and cellulose acetate, or backings of other hydrophilic materials, glue and casein, and particularly having such backings in film form. A further important object of the invention is the bonding of backing to adhesive in normally tacky and pressure-sensitive adhesive products to prevent transfer of adhesive under all circumstances. Further objects are the provision of a clear cohesive primer providing good anchorage, and of a primer that is clear and colorless, providing clear-colored and neat looking adhesive tape products, and of a method of making such primer and providing such adhesive products. Still further objects of the invention will be more obvious from the following specification.

In accordance with the invention, a primer is prepared by milling one or more elastomers until a fluid solution can be obtained by dissolving in a hydrocarbon solvent (e. g., toluene) and adding to a dilute solution of broken down elastomer a minor proportion, preferably one part by weight for each one to six parts by weight of elastomer of one or more compounds selected from the group consisting of compounds of the formula

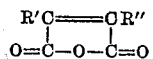

and

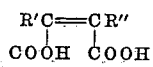

Wherein R' and R" are selected from the group consisting of alkyl or aralkyl having no more than eight carbon atoms, chlorine and hydrogen.

The above group includes various derivatives of maleic anhydride but not phthalic anhydride. Among preferred compounds for purposes of this invention are maleic anhydride, monochlor maleic anhydride, dichlor maleic anhydride, ethyl maleic anhydride, dimethyl maleic anhydride and beta-ethyl phenyl maleic anhydride.

In the formation of the primer, preferably minor amounts (from one-half of one percent of the weight of the rubber in the primer) of organic peroxides are used, which readily form free radicals upon moderate heating; for instance, at the boiling point of benzene or toluene, the reaction takes place at or about the decomposition temperature of the peroxide involved. The more broken down the rubber, the less peroxide is required.

It is preferred that the rubber solution have an intrinsic viscosity of 1.5 poises or less prior to reaction, at which degree of rubber breakdown fifteen to thirty-three percent by weight of maleic anhydride, based on the rubber, and one-half of one percent to ten percent benzoyl peroxide, based on the rubber hydrocarbon, may be employed.

The primer of the invention is preferably applied to a hydrophilic base in a very thin coat at a coating weight of from about one-hundredth to about one-quarter of one ounce per square yard dry weight, and dried for a short time at a moderate temperture. The lower weights of primer are most suitable for films, while the upper range specified is used for woven or non-woven fibrous backings. A pressure-sensitive adhesive compound may then be applied to the primed sheet at a dry coating weight from about one-half to about five ounces per square yard. For best results, the primer and the adhesive are both applied from compatible rubber solvents, e. g. heptane. Among the polymers particularly suitable for use in the preparation of primers are: natural rubbers; the polymers and copolymers of butadiene, in which the diene consists of twenty percent or more by weight; or isoprene polymers or copolymers of similar unsaturation.

Among the organic peroxides that may be used to best advantage are benzoyl peroxide, cumene hydroperoxide, paramenthane hydroperoxide, diisopropyl benzene hydroperoxide, tertiary butyl peroxide, acetyl peroxide, hydrogen peroxide and zinc peroxide. The invention may be used with any hydrophilic backing but is most useful with regenerated cellulose film, cellulose acetate and other hydrophilic cellulosic films.

Further details of the invention will become apparent from the following examples and tables furnished by way of explanation with the limitation of the invention.

EXAMPLE I

The primer material is prepared by milling pale crepe natural Hevea rubber until a fluid solution can be prepared in a suitable inert solvent such as toluene, for example by milling in a tight mill for ten minutes. To a dilute hydrocarbon solution of the broken down elastomer, comprising preferably less than five percent by weight of solids in the solution, add one part of the maleic anhydride for each one to six parts of elastomer in the presence of a minor proportion of peroxide, and heat it for from one to six hours. A typical operating formula by weight for this example is as follows:

| | Parts |
|---|---|
| Maleic anhydride | 1 |
| Natural rubber pale crepe | 3 |
| Benzoyl peroxide | 0.5 |
| Toluene | 100 |

In this example the solution was placed in a three-neck, round bottom flask fitted with a stirrer, reflux condenser and thermometer, and heated. The other materials were dissolved in a small amount of toluene and added rapidly, followed by refluxing of the mixture for four hours.

A two-mil cellophane sheet was coated with the above solution to a coating weight of one one-hundredth of one ounce per square yard and dried for three minutes at ninety-five degrees centigrade. A pressure-sensitive adhesive solution was applied to the primed sheet from a thirty percent by weight solution in normal heptane to produce a dry coating weight of approximately one ounce per square yard. Any normally tacky and pressure-sensitive adhesive composition compatible with the primer and more cohesive than adhesive, but still tacky, may be used. Preferred are compositions based on one or more rubber, which term as used herein includes natural rubber, reclaim, butadiene copolymers with monovinyl polymers such as styrene, and alkyl acrylates having from one to eight carbons in the alkyl chain. In the case of the copolymer, at least ten percent by weight of the vinyl or acrylic modification, and at least twenty percent of the diene, should be present in the copolymer. Any of the following adhesive compositions and their many variations that are well known in the art may be used.

Adhesive compositions:
- A. 100 parts milled natural rubber
  67.25 parts beta-pinene polymer resin (M. P. 95 degress centigrade)
  5 parts medium viscosity petroleum oil
  2 parts antioxidant (e. g. polymerized dimethyl dihydroquinoline)
- B. 100 parts light tube reclaim rubber (sixty percent hydrocarbon)
  25 parts zinc oxide
  75 parts triglyceryl ester of hydrogenated rosin
  5 parts triphenyl phosphite
- C. 100 parts butadiene styrene copolymer (75:25), Mooney viscosity 60
  37.5 parts coumarone-indene copolymer resin ratio by weight (M. P. 115 degrees centigrade)
  20 parts liquid alpha-methyl styrene polymer
  1 part antioxidant (e. g. phenyl naphthyl amine)
- D. 100 parts polyvinyl ethyl ether polymer (intrinsic viscosity 2.4)
  40 parts hydroabietyl alcohol
- E. 100 parts poly-2 ethyl hexyl acrylate (intrinsic viscosity 1.6)
  5 parts methyl ester of hydrogenated rosin
- F. 100 parts butadiene-acrylonitrile copolymer (75:25) non-heat advancing, Mooney viscosity 80
  5 parts rutile type titanium dioxide pigment
  40 parts Vinsol resin (hydrocarbon solvent insoluble rosin residue)
  60 parts dimethoxy ethyl phthalate Adhesive sheets prepared in the manner of Example I have remarkable wet resistance even when water-sensitive backings such as regenerated cellulose film are used as in the example. These adhesive sheets can be pressed down on surfaces such as glass or steel and immersed in water for many hours, after which the sheets may be stripped with the adhesive intact and solidly anchored to the backing. No trace of the adhesive remains on the submerged or wet surface. If adhesive sheets using previously known primers undergo tests of this type, separation of adhesives and backing occurs often in a shorter time than forty seconds, or, even under the most favorable circumstances, the complete film of the adhesive is left on the surface if an attempt is made to strip the adhesive from glass or steel. The adhesive sheet of the invention will not show transfer of adhesive even when the dry sheet is pressed repeatedly into adhesive contact with itself and pulled apart rapidly. In the above example the amount of milling to which the rubber is subjected prior to preparation of the primer is not critical so long as a final fluid solution is obtained. It has been found that the peroxide and maleic anhydride reaction with the elastomer which occurs during refluxing may cause gelation of the solution if insufficient rubber milling is performed, or if the relative proportions of peroxide and maleic anhydride are too great. It is preferred that the rubber solution have an intrinsic viscosity of one and one-half or less, at which degree of rubber breakdown fifteen to thirty percent maleic anhydride and five to twenty percent benzoyl peroxide (based on rubber hydrocarbon) may be employed. At other degrees of rubber breakdown, one-tenth of one percent to twenty-five percent peroxide and five percent to fifty percent maleic anhydride are useful, although at the lower ranges of the treatment the priming action of the rubber solution are somewhat inferior.

EXAMPLE II

| | Parts |
|---|---|
| Maleic acid | 1 |
| Butadiene-styrene copolymer (e. g. GR–S X496) | 3 |
| Xylene | 100 |
| Cumene hydroperoxide | 0.3 |

GR–S X496 is a copolymer of seventy percent butadiene, thirty percent styrene with rosin soap emulsifier polymerized to a Mooney viscosity of 50–58 and salt-acid coagulated. As in Example I, the polymer is milled to give more ready solution and the mixture containing all ingredients is refluxed four hours. The product is thinly coated on cellulose acetate sheet and force dried, whereupon an adhesive of composition B is applied at one ounce per square yard. This adhesive sheet had good anchorage to the primed face under both wet and dry conditions.

Resinous materials are sometimes incorporated into the primer to insure good anchorage without destroying the moisture-resistance. Such materials should be present in minor amounts, however, so as not to give a tacky surface prior to mass coating. They are preferably used when desired in amounts of from five–twenty-five percent of the elastomer in the primer and may be terpene or coumarone-indene resins, rosin or its esters, as well as esters of hydroabietyl alcohol. For example hydroabietyl borate, made from one mole of hydroabietyl alcohol with thirty-five hundredths mole boric acid by heating to drive off the liberated water, was found to give good results when used as a minor addition to the above primers.

It is desirable to coat the adhesive on the primed sheet or other type backing without too great an interval of time having elapsed from the priming operation. After one week's storage of the primed roll, the priming effectiveness is definitely inferior to that obtained when the primed roll is coated with adhesive within one or two days.

The following table illustrates the results obtained from some actual examples which I prepared. The final tapes were compared in anchorage by pressing adhesive side into contact with adhesive side and pulling apart rapidly several times. If no transfer occurred, the anchorage was rated good. And if transfer was substantially complete, there was considered to be no anchorage. Wet anchorage is the force required to separate the wet tape from a polished steel panel after the tape is rolled onto the panel with a four and one-half pound weight and is immersed in water for one hour.

| Example No. | Elastomer | Reagent | Percent of Reagent Based on Total Primer Weight | Catalyst | Percent of Catalyst Based on Total Primer Weight |
|---|---|---|---|---|---|
| 1 | pale crepe | Monochlormaleic anhydride | 23 | Benzoyl peroxide | 7 |
| 2 | do | Dichlormaleic anhydride | 28 | do | 7 |
| 3 | do | do | 6 | do | 1 |
| 4 | do | Maleic acid | 13 | do | 8 |
| 5 | do | do | 22 | do | 13 |
| 6 | do | do | 40 | do | 20 |
| 7 | do | Maleic anhydride | 15 | do | 8 |
| 8 | do | Maleic anhydride and hydroabietyl borate | 15 / 30 | do | 9 |
| 9 | GRS-X-245 [1] | Maleic anhydride | 23 | do | 6 |
| 10 | GRS-X-496-SP [2] | do | 13 | do | 4 |
| 11 | GRS-10 [3] | do | 22 | do | 13 |
| 12 | Polychloroprene | do | 9 | do | 12 |
| 13 | GRS-X-496-SP | do | 24 | do | 6 |
| 14 | Neoprene GN (P-3) | do | 44 | do | 12 |
| 15 | pale crepe | Maleic anhydride and hydroabietyl borate | 15 / 30 | do | 9 |
| 16 | do | do | 13 / 13 | do | 9 |
| 17 | do | do | 20 / 16 | do | 6 |
| 18 | do | Maleic anhydride | 23 | do | 6 |
| 19 | do | do | 23 | t-butyl peroxide | 6 |
| 20 | do | do | 23 | Cumene hydroperoxide | 6 |
| 21 | do | Monochlormaleic anhydride | 23 | t-butyl permaleic acid | 7 |
| 22 | Buna-rubber [4] | Maleic anhydride | 23 | Benzoyl peroxide | 7 |
| 23 | Buna-rubber | do | 23 | do | 7 |
| 24 | do | do | 23 | do | 7 |
| 25 | pale crepe | do | 24 | do | 6 |
| 26 | Neoprene GN (P-3) | do | 9 | do | 3 |

| Example No. | Reflux | | Drying on Sheet | | Adhesive Compo. Bonded | Backing Adhes. Was Bonded To— | Anchorage | |
|---|---|---|---|---|---|---|---|---|
| | Temp., °C. | Time | Time | Temp., °C. | | | Dry | Wet |
| 1 | 110 | 5 hours | 1 hr | 35 | A | Cellophane | Excellent | Good. |
| 2 | 110 | 10 min | 10 min | 88 | A | do | Good | Excellent. |
| 3 | 110 | 10 min | do | 85 | A | do | do | Very Good. |
| 4 | 130 | 4 hours | do | 85 | A | do | do | Good. |
| 5 | 130 | do | do | 85 | A | do | do | Very Good. |
| 6 | 130 | do | do | 85 | A | do | do | Good. |
| 7 | 95 | 1 hour | do | 85 | A | do | do | Excellent. |
| 8 | 110 | 6 hours | 24 hrs | Room temp. | A | do | do | Do. |
| 9 | 110 | 1 hour | 10 min | 85 | A | do | do | Good. |
| 10 | 110 | do | do | 85 | A | do | Fair | Excellent. |
| 11 | 110 | 5 hours | do | 85 | A | do | Good | Do. |
| 12 | 110 | 6 hours | do | 85 | A | do | do | Good. |
| 13 | 110 | 2 min | do | 85 | B | do | do | Do. |
| 14 | 110 | 6 hours | do | 85 | B | do | do | Do. |
| 15 | 110 | 3 hours | do | 85 | B | Cotton Cloth | do | Excellent. |
| 16 | 110 | do | do | 85 | B | do | do | Do. |
| 17 | 110 | 5 hours | do | 85 | A | do | do | Do. |
| 18 | 110 | 6 hours | do | 85 | A | Cellophane | do | Do. |
| 19 | 110 | do | do | 85 | A | do | do | Do. |
| 20 | 110 | 1 hour | ½ hour | 35 | A | do | do | Do. |
| 21 | 110 | 2½ hours | 1 hour | 35 | A | do | Very good | Good. |
| 22 | 110 | 1 min.[5] | 10 min | 85 | C | do | Good | Do. |
| 23 | 110 | 1 min.[5] | do | 85 | E | do | do | Excellent. |
| 24 | 110 | 1 min.[5] | do | 85 | F | do | do | Do. |
| 25 | 110 | 1 hour | do | 85 | D | do | do | |
| 26 | 110 | 6 hours | do | 85 | D | do | do | |

[1] GRS-X-245—butadiene/styrene copolymer, 50/50 ratio butadiene to styrene; 40–50 Mooney viscosity.
[2] GRS-X-496-SP—butadiene/styrene copolymer, 71/29 ratio butadiene to styrene; 65–75 Mooney viscosity.
[3] GRS-10—butadiene/styrene copolymer, 71/29 ratio butadiene to styrene; 50–58 Mooney voscosity.
[4] Buna rubber—butadiene/acrylonitrile copolymer; 75/25 ratio butadiene to styrene.
[5] Further reflex results in gelation.

In considering the above results it is important to note that many products remotely related to maleic anhydride did not show priming affinities of the type of the compounds disclosed above. Among such products found unsuitable are: acetic acid, acrylonitrile, diethyleneacrylate, and phthalic anhydride.

Using the catalysts of the invention, a wide range of percentages by weight of catalysts within the composition may be employed, ranging from about one-half of one percent to about ten percent by weight. According to the theory of the reaction involved in this primer, maleic anhydride reacts with polymer having unsaturated bonds. Best priming is obtained with a reaction product of the maleic anhydride derivative of natural rubber, polyisoprene and butadiene polymers and copolymers. The age of the primers prior to the application to the backing is not as important as the time between priming and coating the adhesive mass. This latter time should preferably be less than twenty-four hours. For optimum results, three hours of refluxing are recommended. When the solvent boiling point is 100–115 degrees centigrade, the time may be decreased by use of more active catalysts, i. e., peroxides, which decompose at lower temperatures, or by use of higher boiling solvents. The type of dienophile selected may also influence the time of reaction, since a successful primer was obtained from monochloro-maleic anhydride after only one hour of reflux. Even this primer, however, was improved in bond strength by further refluxing.

Among preferred peroxides are:

*In benzene*

Diisopropyl benzene hydroperoxide
p-Menthane hydroperoxide
Cumene hydroperoxide
t-Butyl hydroperoxide
Hydroxyheptyl peroxide
Methyl amyl ketone peroxide

*In toluene or higher boiling solvents* t-Butyl permaleic acid
t-Butyl perbenzoate
Di-t-butyl diperphthalate
t-Butyl-perphthalic acid
p-Chloro benzoyl peroxide
Benzoyl peroxide
Diacityl peroxide As shown in the accompanying drawing the primer 2 is coated on one side of the backing 1 and the adhesive 3 is coated over the primer coat, the primer coat anchoring the adhesive coat to the backing.

I claim:

1. A normally tacky and pressure-sensitive adhesive tape comprising: a hydrophilic base, a primer coating thereon having a coating weight of from about one-hundredth to about one-quarter of one ounce per square yard, said primer being soluble in and applied from an organic solvent and comprising an organic solvent soluble reaction product of from about one to about six parts by weight of at least one broken down elastomer reactant and about one part of one or more reactant compound selected from the group consisting of compounds of the formulae

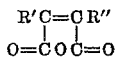

and

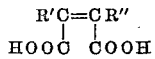

wherein R' and R" are selected from the group consisting of alkyl and aralkyl having no more than eight carbon atoms, chlorine and hydrogen; and on said primer coating, a coating of a normally tacky and pressure-sensitive adhesive compatible with the primer and applied from a compatible rubber solvent to a dry coating weight of from about one-half ounce to about five ounces per square yard.

2. Adhesive tape according to claim 1, comprising a peroxide reaction product as said primer.

3. Adhesive tape according to claim 1, wherein said film base is cellulosic.

4. Adhesive tape according to claim 1, wherein said film base is regenerated cellulose.

5. Adhesive tape according to claim 1, wherein said primer is based on natural rubber.

6. Adhesive tape according to claim 1, wherein said primer is based on maleic anhydride.

7. Adhesive tape according to claim 1, wherein said primer is based on maleic acid.

8. Adhesive tape according to claim 1, wherein said adhesive is based on one or more rubbers.

9. Adhesive tape according to claim 1, wherein said adhesive comprises natural rubber.

10. Adhesive tape according to claim 1, wherein said adhesive comprises butadiene copolymer.

11. The process of making normally tacky and pressure-sensitive adhesive tape comprising the step of: breaking down elastomer reactant until a fluid solution can be obtained; adding for each one to six parts by weight of elastomer reactant about one or more reactant compounds selected from the group consisting of compounds of the formulae

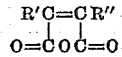

and

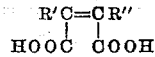

wherein R' and R" are selected from the group consisting of alkyl and aralkyl having no more than eight carbon atoms, chlorine and hydrogen, reacting said reactants to form a reaction product soluble in organic solvent, coating said primer on a hydrophilic base to a coating weight of from about one-hundredth to about one-tenth of one ounce per square yard; and applying thereon a normally tacky and pressure-sensitive adhesive composition compatible with the primer and applied from a compatible rubber solvent to a dry coating weight of from about one-half to about five ounces per square yard.

References Cited in the file of this patent

UNITED STATES PATENTS

| | | |
|---|---|---|
| 2,236,567 | Drew | Apr. 1, 1941 |
| 2,383,569 | Roberts | Aug. 28, 1945 |
| 2,388,905 | Compagnon et al. | Nov. 13, 1945 |